Aug. 6, 1935.  C. S. BRAGG ET AL  2,010,477

BRAKE MECHANISM

Filed May 28, 1931  2 Sheets-Sheet 1

INVENTORS.
CALEB S. BRAGG
VICTOR W. KLIESRATH
BY
ATTORNEY.

Aug. 6, 1935.   C. S. BRAGG ET AL   2,010,477
BRAKE MECHANISM
Filed May 28, 1931   2 Sheets-Sheet 2

INVENTORS.
CALEB S. BRAGG
BY VICTOR W. KLIESRATH
H. Q. Clayton
ATTORNEY.

Patented Aug. 6, 1935

2,010,477

UNITED STATES PATENT OFFICE 2,010,477

BRAKE MECHANISM

Caleb S. Bragg, Palm Beach, Fla., and Victor W. Kliesrath, Port Washington, N. Y., assignors to Bragg-Kliesrath Corporation, Long Island City, N. Y., a corporation of New York Application May 28, 1931, Serial No. 540,686

10 Claims. (Cl. 188—152)

This invention relates to an improved brake-applying mechanism, and particularly to that class of brake mechanism wherein an auxiliary source of power is controlled to aid the operator in applying brakes. Such mechanism is particularly useful on motor vehicles such as heavy busses and trucks where brakes must be frequently and forcibly applied and where a source of fluid pressure is readily available such as that derived from the evacuated condition of the intake manifold of the engine at closed or partially closed throttle.

In such systems it is the usual practice to manually operate a valve to control the power output of a fluid actuator or servomotor acting on the brake mechanism, and in order that this control may be completely effective the conventional structure is such as to apprise the operator at all times during the application of the brake of the degree of power application. This feature is known in the trade as pedal "feel" or pedal reaction, and it is one of the principal objects of my invention to provide an effective power brake mechanism wherein the "feel" attribute may be varied in an exceedingly simple fashion.

In a preferred embodiment of the invention both the servomotor and the valve are so constructed and so arranged with respect to both the manually operated part and the brake mechanism as to effect the desired reaction or "feel" during the operation of the brake, the reaction of either the valve or the motor, or both, being rendered adjustable at the will of the operator. The parts are also so arranged and constructed as to progressively vary the "feel" or reacting force during the braking operation.

A further object of the invention is to provide, in combination with the aforementioned attributes, a valve structure which will enhance the control of the motor by providing for the automatic lapping or cutting-off of the power when and if the pedal is held stationary during the braking operation.

It is a further object of the invention to provide a compact power brake mechanism wherein the valve, motor, pedal and power transmission linkage parts are so arranged with respect to each other as to make possible an appreciable reduction in the number of their parts as compared to the conventional parts corresponding in kind.

Further objects of the invention and desirable combinations of parts and details of construction will become apparent from the following detailed description of certain preferred embodiments of the invention disclosed in the accompanying drawings, in which.

Figure 1:
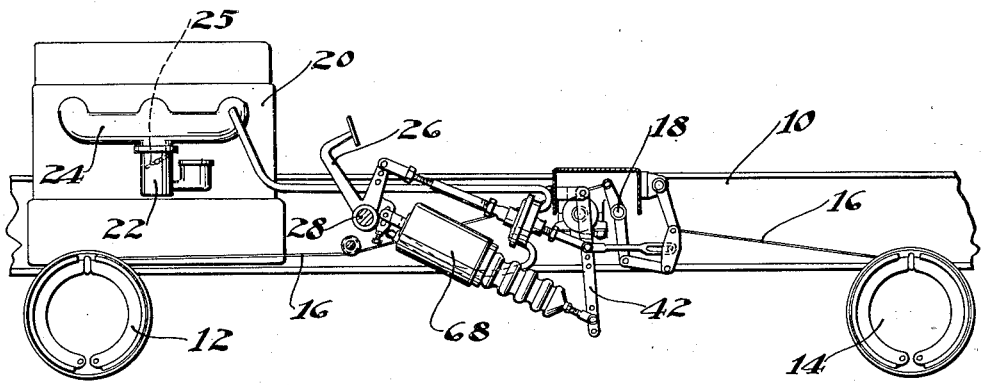
Figure 1 is a diagrammatic representation of an automotive vehicle operated by an internal combustion engine and provided with brake mechanism operable by our invention.
Figure 2:
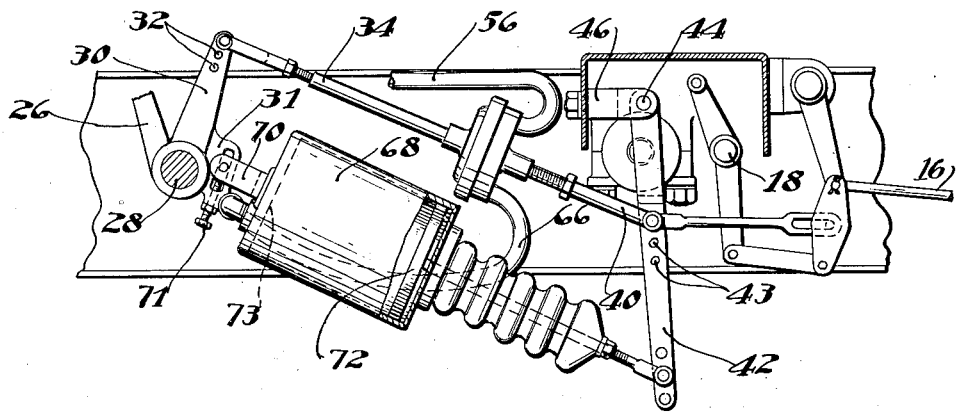
Figure 2 is an enlarged view of the brake operating mechanism shown in Figure 1, the same being in released or "brake-off" position.

Referring by reference characters to the drawings and to that embodiment of our invention disclosed in Figures 1 and 2, 10 represents a portion of the chassis of an automotive vehicle provided with wheel brake mechanisms, one of the front wheel brake mechanisms being indicated at 12 and one of the rear wheel brake mechanisms being indicated at 14. The brake mechanisms may be of any desired type; however, as disclosed, they comprise outwardly movable shoe members contactable with a brake drum, the shoe members being operable by cam members rotatable through the intermediary of tension elements 16. The linkage interconnecting the lever 42 with the brake operating tension elements 16 constitutes no part whatsoever of the present invention, that disclosed in Figures 1 and 2 representing any one of many hook-ups that might be employed to simultaneously apply the brakes of the vehicle.

The vehicle is provided with the usual internal combustion engine 20 for propelling it in the usual manner, which engine is provided with a throttle controlled suction passage comprising a vertical passage 22, intake manifold 24 and throttle 25.

The brake operating mechanism constituting the essential feature of our invention includes the usual manually operable pedal 26 pivotally mounted at 28 to a support fixed to the chassis. The pedal is further provided with an arm 30 having openings 32 at its end to adjustably receive a valve operating tension link 34. The valve, which is disclosed in detail in Figure 4, preferably comprises a casing formed in two parts 36 and 38 connected respectively to the link 34, connected to the pedal and to a link 40, which is adjustably connected to a lever member 42 having openings 43, the lever 42 being pivotally mounted at 44 to a support 46 rigidly secured to a cross member of the chassis. The parts 36 and 38 of the valve clamp between them the marginal portions of a diaphragm valve member indicated at 48, which in the released position of the valve is seated upon an annular seat 50 on the casing member 38. The member 48 is also provided with air inlet apertures 51 communicating with the atmosphere through apertures 52 in the casing member 36. The annular seat 50 divides the interior of the valve into an annular suction chamber 54, communicating with the engine manifold by flexible conduit 56, and a central chamber 58 normally vented to the atmosphere.

Figure 4:
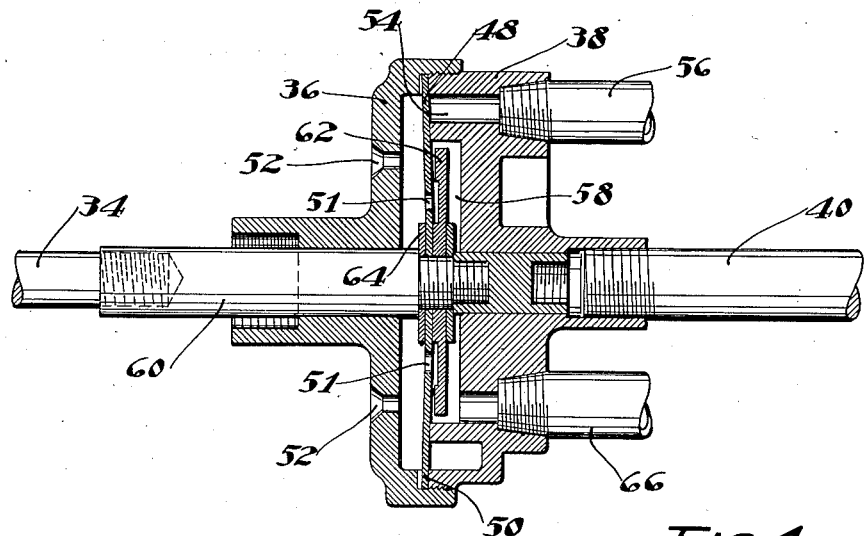
Figure 4 is an enlarged sectional view of the controlling valve mechanism illustrated in Figure 1.

60 represents a valve actuating part extending through a guiding aperture in the valve casing member 36. The central portion of the diaphragm 48 is secured to the valve actuating part 60, which part also carries a disk valve 62 having a peripheral seat adapted to seat on the diaphragm 48. Disk 62 is, however, normally held in unseated position when the parts are in released position as shown in Figure 4. The valve actuating part 60 is also provided with means such as a collar 64 to engage the casing member 36 and limit the relative movement between the valve diaphragm parts and the valve casing parts. The valve casing member 38 is also provided with a flexible conduit 66 communicating with the central chamber 58 and with the closed end of a servomotor or fluid actuator cylinder 68. The motor is preferably adjustably connected to a boss 31 on the arm 30, the end of link 70 being adjustably secured along a slot in the boss by a set screw 71.

In the released position of the parts it will be seen that the diaphragm 48 is seated on the annular seat 50, cutting-off communication between the suction passage and the actuator cylinder. The interior of the cylinder is maintained in communication with the atmosphere through the apertures 51 in the diaphragm 48 and the apertures 52 in the valve casing member 36. It will also be understood that when the operator depresses the foot pedal 26 to apply the brakes the valve actuating link 34 will be drawn forward first seating the disk valve 62 on the diaphragm 48 so as to cut-off the interior of the cylinder from the atmosphere, after which the diaphragm will be unseated, thereby placing chamber 58 and the interior of the cylinder 68 in communication with the suction pipe 56. As the air is withdrawn from the interior of the cylinder there will be a gradually increasing differential of fluid pressures on the opposite faces of the piston 72 of the fluid motor and on the opposite faces of the head or end face 73 of the cylinder urging the piston and cylinder body respectively in opposite directions. As both the body and piston of the actuator are movable and said movable parts travel in the same direction, the stroke of the piston may be greater than the length of the cylinder.

Such a construction permits of a compact or small fluid motor or actuator which enables it to be conveniently mounted as disclosed, that is suspended between the pedal 26 and the brake actuating crank arm 42. Such a mounting also provides for the desired reaction load or "feel" upon the foot of the driver during the operation of the brakes by power; for as the interior of the actuator is evacuated and the parts thereof subjected to pressure differentials a load is imposed upon the pedal arm 30 and pedal 36 in opposition to movement thereof, which load is a function of the degree of evacuation or degree of braking force derived from the actuator.

It will be also understood that in the type of valve mechanism shown that the outer faces of the diaphragm 48 and the casing member 38 will be exposed, during a power stroke of the actuator, to the same differential of fluid pressure as the members of the power actuator, the load imposed upon the diaphragm 48 placing the link 34 in tension to resist the forward movement of the pedal lever and providing a reactionary force upon the driver's foot which is a function of the degree of evacuation of the valve chamber 58 and likewise proportionate to the power being exerted by the actuator on the brake mechanism.

Thus by virtue of the construction of the valve just described and the suspension of the relatively movable parts of the actuator between the brake operating lever 42 and the pedal lever 26 there is obtained the desired load upon the pedal during the operation of the brake, which load apprises the operator through the increasing resistance or reaction upon the sole of his foot of the amount of brake-applying force being exerted on the brake mechanism.

This permits one size of valve mechanism to be used on all sizes of motor vehicles having various pedal ratios and to give the desired amount of reaction to suit the individual driver, by so mounting and adjusting the cylinder.

It is to be particularly noted as the distinguishing feature of our invention that the degree of reaction derived from either the valve or actuator, or both, may be varied at the will of the operator; this by virtue of the adjustability of the connections between the link 34 and the arm 30, between link 40 and arm 42 and lastly, between the power actuator casing arm 70 and the boss 31. Any one of these connections may be varied to change the valve and actuator moment arms of the pedal lever 26 to thus vary the degree of load imposed upon the pedal. It is also to be particularly noted that the moment arm of the actuator, that is the point of connection of link 70 with boss 31 progressively changes as the pedal is moved to the floor board, thus automatically and progressively varying the reaction load or "feel" upon the operator's foot. Depending upon the adjustment of the parts the "feel" may progressively increase or decrease as the pedal is moved and the brakes applied by power. It is preferable, of course, to progressively increase the "feel" to thus simulate an exclusive manual braking operation.

Figure 3:
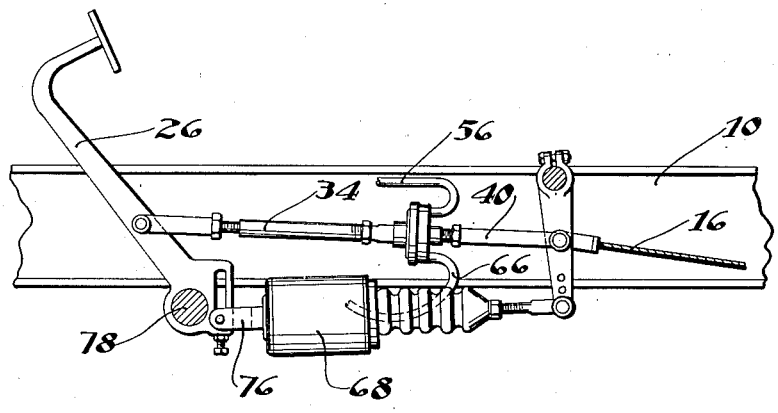
Figure 3 is a view similar to Figure 2 disclosing a modified form of brake mechanism.

If desired, the link 34 may be connected directly and positively to the pedal as disclosed in Figure 3 and the cylinder adjustably connected as by the aforementioned set screw and slot to an arm 76 below the fulcrum pivot 78 of the pedal 26. With such a construction the reacting load from the actuator acts to involuntarily actuate the pedal to recrack the valve and apply the brakes. This effect is preferably more than neutralized by the reacting load from the valve, however, and may be reversed as the point of connection moves above the fulcrum as the pedal moves toward the floor board. This organization of the brake operating parts may be desired by virtue of the particular geometry and arrangement of the remaining chassis parts.

It will be understood that while the illustrated embodiments of the invention are described as shown, a considerable latitude is to be permitted in construction within the range of the appended claims.

We claim:

1. A brake operating mechanism comprising, in combination, a manually operable lever member, a brake structure, a valve member and a servomotor, connections directly interconnecting said motor, lever member and brake structure and other connections directly interconnecting said lever member, valve and brake structure, both of said connections being arranged to transmit a reactionary force upon said lever member during the actuation of the brake structure.

2. A brake operating mechanism comprising, in combination, a manually operable lever member, a brake structure, a two part valve member having elements therein subject to differentials in pressure, a servomotor, connections directly interconnecting said motor, lever member and brake structure and other connections directly interconnecting said lever member, valve and brake structure so arranged that a reaction from the differentials in pressure in said valve is felt upon said lever member, said latter connections including a link interconnecting one part of said valve with said lever member and a second link interconnecting the other part of said valve and said brake structure.

3. A brake operating mechanism including a pedal, a brake mechanism and a servomotor having cylinder and piston elements, said elements adjustably connected respectively to said pedal and brake member, the adjustable connection between said pedal and cylinder lying between the fulcrum of the pedal and its applying end, together with a tension linkage connecting said pedal and brake structure, said linkage including a valve member.

4. A brake operating mechanism including a pedal, a brake mechanism and a servomotor having cylinder and piston elements, said elements adjustably connected respectively to said pedal and brake member, the adjustable connection between said pedal and cylinder lying between the fulcrum of the pedal and its applying end, together with a tension linkage connecting said pedal and brake structure, said linkage including a valve member comprising two parts connected respectively to said brake structure and said pedal and formed to provide a vacuum chamber between said parts.

5. A brake operating mechanism comprising a manually operable member, a lever member to be operated thereby, a tension member therebetween, a power operating piston member, a connection between said piston member and said lever member to be operated, a cylinder member adapted to receive said piston member, said cylinder member connected to said manually operable member, a control element for said power operated member, said control element constituting a part of said tension member and reacting upon said manually operable member.

6. A brake operating mechanism comprising a manually operable member, a brake operating member, a tension member interconnecting said members, said tension member including telescoping valve members, relatively movable power operated members connected respectively to said manually operable member and to said brake member to be operated, said valve member constructed to provide for a reaction upon said manually operable member during the actuation of the brake.

7. A brake operating mechanism comprising, in combination, a pedal member, a brake operating lever member, together with collapsible motor members suspended between said pedal and lever members, the connection between one of said motor members and said pedal member being an adjustable one and, in the brake off position of the parts, lying below the fulcrum of said lever member, said connection being so constructed that the pedal is applied during the first part of the collapsing movement of the motor members and by virtue of said movement and then reacts to oppose operation of the pedal during the last part of the collapsing movement of the motor members, together with valvular means for controlling the operation of said motor, said latter means being so constructed and so connected to the various parts of the mechanism as to react to oppose the applying movement of the pedal and thereby cooperate with the aforementioned collapsible motor parts to determine the resultant mode of operation of the pedal member.

8. A brake operating mechanism including a pedal lever member comprising three parts projecting from the fulcrum support of the pedal lever member, a brake mechanism and a servomotor having cylinder and piston elements, said elements being connected to one projecting part of said pedal and to the brake mechanism, the connection between said projection and one of the motor elements lying between the fulcrum of the pedal and its applying end, together with a tension linkage connecting said pedal and brake structure, said linkage including a valve member comprising two parts connected respectively to one of the aforementioned projecting parts and to the brake structure, said valve member being formed to provide a vacuum chamber between its parts.

9. A brake operating mechanism including a pedal lever member comprising three parts projecting from the fulcrum support of the pedal, a brake mechanism and a servomotor having cylinder and piston elements, said elements being adjustably connected respectively to one projecting part of said pedal and to the brake mechanism, together with a tension linkage connecting said brake structure and another of said projecting pedal parts, said linkage including a valve member comprising two parts connected respectively to said brake structure and projection and formed to provide a vacuum chamber between said parts.

10. A brake operating system for an automotive vehicle including a frame comprising, in combination, a foot pedal pivoted on said frame, a brake operating structure, a valve member having a movable element on opposite sides of which fluid under differential pressures acts, a servomotor including a cylinder, a connection between said pedal and said valve member, a connection movable relative to said frame and arranged between said pedal and said servomotor, a connection between said valve and said brake operating structure, and a connection between said cylinder and said brake operating structure.

CALEB S. BRAGG.
      VICTOR W. KLIESRATH.